United States Patent
Konopacki et al.

(10) Patent No.: US 10,740,585 B2
(45) Date of Patent: Aug. 11, 2020

(54) SYSTEM AND APPARATUS FOR IDENTIFYING BOILER TUBES

(71) Applicant: General Electric Technology GmbH, Baden (CH)

(72) Inventors: Ronald Konopacki, Suffield, CT (US); Matthew David Allen, Windsor, CT (US); Allan Gunn Ferry, Windsor, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 16/217,717

(22) Filed: Dec. 12, 2018

(65) Prior Publication Data

US 2020/0193114 A1 Jun. 18, 2020

(51) Int. Cl.
| | |
|---|---|
| *H04N 5/247* | (2006.01) |
| *G06K 7/14* | (2006.01) |
| *H04N 5/262* | (2006.01) |
| *H04N 5/225* | (2006.01) |
| *G06K 7/10* | (2006.01) |

(52) U.S. Cl.
CPC ......... *G06K 7/1491* (2013.01); *H04N 5/2256* (2013.01); *H04N 5/247* (2013.01); *H04N 5/2624* (2013.01); *G06K 2007/10514* (2013.01)

(58) Field of Classification Search
None
See application file for complete search history.

(56) References Cited

U.S. PATENT DOCUMENTS

| | | |
|---|---|---|
| 5,481,100 A | 1/1996 | Terauchi |
| 2012/0187195 A1* | 7/2012 | Actis ............... G07G 1/0045 235/479 |
| 2014/0097251 A1 | 4/2014 | Joussen et al. |
| 2017/0185815 A1 | 6/2017 | Itoh |

(Continued)

FOREIGN PATENT DOCUMENTS

| | | |
|---|---|---|
| EP | 0 851 376 | 7/1998 |
| EP | 0 999 513 | 5/2000 |

(Continued)

OTHER PUBLICATIONS

International Search Report issued in corresponding PCT Application No. PCT/EP2019/025452 dated Mar. 31, 2020.

*Primary Examiner* — Eileen M Adams
(74) *Attorney, Agent, or Firm* — Grogan, Tuccillo & Vanderleeden, LLP

(57) ABSTRACT

A system and method for reading a barcode displayed on an object is provided. The system includes a barcode reader having a plurality of cameras communicatively coupled to an image processor, and a controller device communicatively coupled to the plurality of cameras and the image processor. The cameras are arranged to define a first opening therebetween sized to receive the object therein. The controller device triggers an operation of each camera. Each camera is operative to capture a respective image of a different corresponding portion of the surface of the object, and to send the respective image to the image processor. The image processor is configured to combine the respective images received from each camera into a composite image, and to read a barcode from the composite image.

20 Claims, 6 Drawing Sheets

(56) References Cited

U.S. PATENT DOCUMENTS

2017/0236371 A1* 8/2017 Froelich ............. G07F 17/3241
                                                463/17
2018/0033140 A1* 2/2018 Wu ................. G01N 35/00732
2018/0330285 A1* 11/2018 Nagao .................... G06Q 10/04

FOREIGN PATENT DOCUMENTS

| JP | H09 259217 | 10/1997 |
| JP | 2013 186627 | 9/2013 |
| WO | 9964980 A1 | 12/1999 |

* cited by examiner

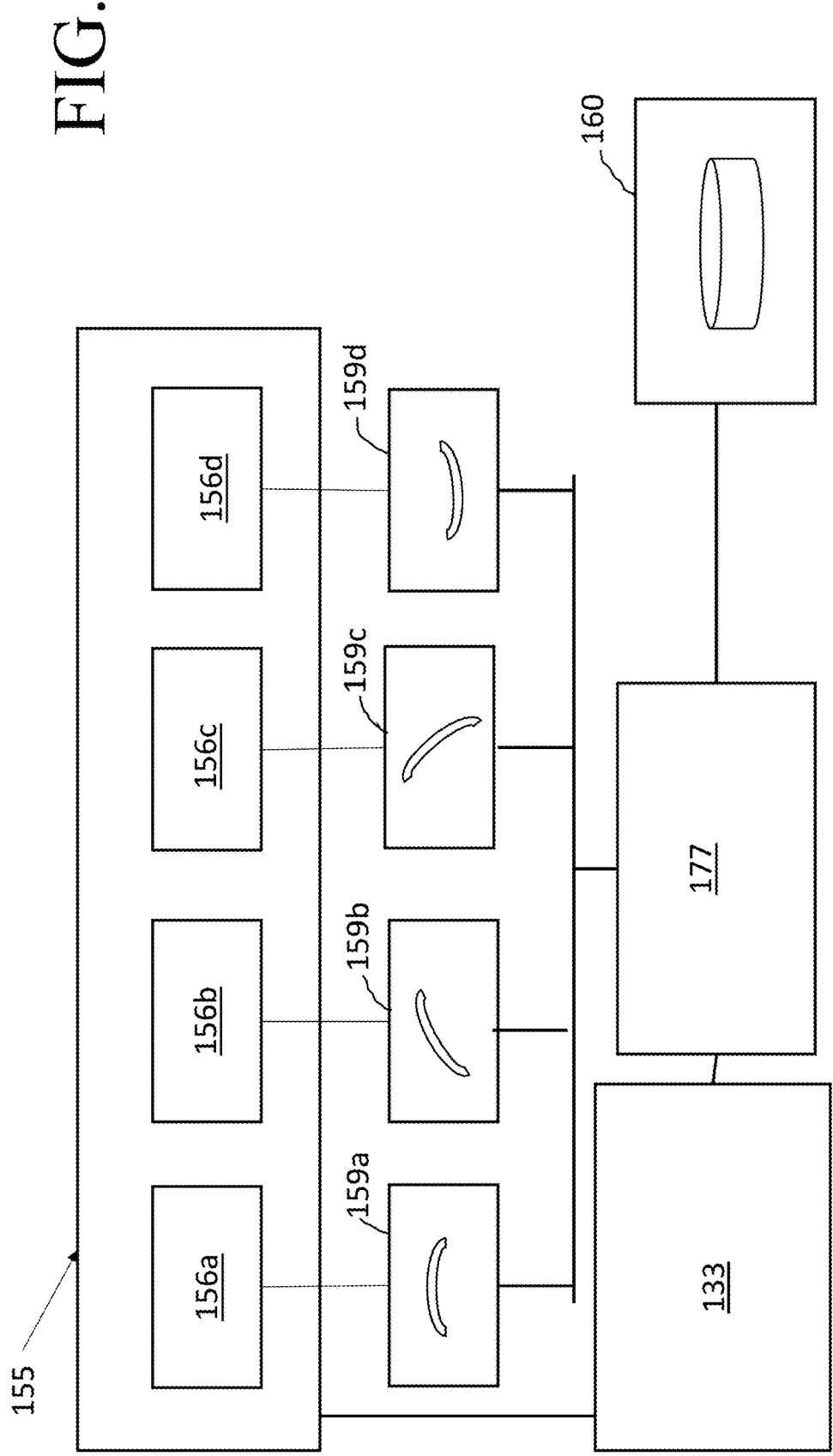

SYSTEM AND APPARATUS FOR IDENTIFYING BOILER TUBES

BACKGROUND

Technical Field

Embodiments of the invention relate generally to

Discussion of Art

In conventional boilers, water circulates inside metal boiler tubes which are heated by hot gases in a furnace cavity used for steam generation. The heat transfer through tubing is the primary means of heating both water and steam in a boiler. The components within boilers that comprise such tubing may include superheaters, reheaters, economizers, and waterwalls.

The boiler tubes may consist of various outside diameters, wall thicknesses, and material composition typically based on the temperature and pressure range of operation. For example, the composition of the tubes may comprise carbon steel or various alloy steels. In other cases, stainless steel or nickel alloys may alternatively used.

In conventional boiler manufacturing and assembly, raw tubing is received in bundles from a source, such as a steel mill. As received, each respective tube typically includes a label with specific identifying tube-related information. The label may include for example information relating to origin, material type, and physical dimensions of the respective tube. Often the label is provided in the form of a barcode printed directly on outside surface of the tube. In other cases, the barcode may be printed on a label, such as a paper or mylar label, which is attached to the outside surface of the tube. Such labels provide a cost-effective technique to track each tube during the manufacturing process.

However, when received from the mill, the raw tubing is typically first processed by cleaning the outer surface of each tube. Conventional cleaning techniques including chemical and abrasive techniques are effective in removing dirt, oils, and other impurities. However, the cleaning techniques typically also result in removal of the information that is printed on or applied to the outside surface of the tubes. Because it is important to the manufacturing process to maintain the material composition identity of each tube, the label information removed by the cleaning may need to be manually re-applied or re-applied by a computer-driven printing system. In addition, other information or data may then additionally be applied as part of the label. For example, the new label may further include tube-specific production information, time stamps, and serial numbers. The additional information may be included directly or by reference.

The printed information on the tube typically includes a barcode with a serial number as well as human readable information along the overall length of the tube in a repeating pattern every meter or other predetermined length. For example, in addition to the unique identification serial number, the barcode can contain the vendor, purchase order number, and heat number, shop order number, and other information. This information can be traceable in the manufacturing system and can also be identified by handheld barcode scanners and automated scanners located at various subsequent operations. The barcode is typically either a one-dimensional (1D) barcode or two-dimensional (2D) barcode.

In order to allow the encoding of larger amounts of data in a single barcode symbol, a number of 1D stacked barcode symbologies have been developed, and are well known in the art. Stacked symbols partition the encoded data into multiple rows, each including a respective 1D bar code pattern, which must be scanned and decoded, then linked together to form a complete message.

Another type of barcode symbology, known as two-dimensional (2D) matrix symbologies, have been developed which offer orientation-free scanning and greater data densities and capacities than their 1D counterparts. 2D matrix codes (for example, QR codes) encode data as dark or light data elements within a regular polygonal matrix, accompanied by graphical finder, orientation and reference structures. When scanning 2D matrix codes, the horizontal and vertical relationships of the data elements are recorded with about equal resolution. The 2D barcodes are often preferred because they can hold more information than a 1D barcode.

2D imaging scanners are a newer type of barcode reader. They use a camera and image processing techniques to decode the barcode. A single large field-of-view reader using a high-resolution industrial camera is typically employed to capture a photograph or image of a barcode during assembly of a boiler. The barcode appearing in the image is then decoded using software. For example, an image of the barcode is acquired using a camera, and lighting arranged to provide an image of the barcode to an image processing device. The processing device uses known software and programs to apply various digital image processing techniques to read the barcode in the image.

By repeating the barcode pattern along the overall tube length, a record of the corresponding tube information is preserved even if a section or portion of the tube is cut off during boiler fabrication, or some future process renders it unreadable along certain portions of its length. In this way, each tube is provided with a unique identification or label, which further enables traceability of the tube to make a Product Lifetime Management (PLM) system practical to implement a boiler product line. However, each label has to be glued exactly to a predetermined position on the tube, thereby making it difficult to read the barcode in the event the barcode label were placed or printed outside of the predetermined position.

In the manufacturing process, some of the tubes may be butt welded end-to-end to form circuits in the boiler. The overall length of tubes welded end-to-end can exceed 100 meters (300 feet). During boiler fabrication, many tubes may additionally have a number of bends formed along their respective lengths. In some cases, fins may be welded to the outside surface of certain tubes to maximize the surface area for improved heat transfer. The manufacturing process for waterwalls combines multiple tubes with edge-welded fin bars arranged to connect a length of each tube to a corresponding length of an immediately adjacent tube. In such waterwalls, the complete circumference (i.e., 360 degrees) of each tube's outer surface may not be readily visible because of certain sections that may be obscured by the width of the fin bar.

A serial number on all components is essential for Product Lifecycle Management (PLM) as it requires tracking all the parts of a product through the manufacturing process. During assembly of the boiler, some tubes are joined or welded to other tubes to form an element assembly. The imprinted unique identification or serial number allows a respective raw tube to be specifically identified as an individual element of the assembly rather than a miscellaneous piece material. The serial number in each barcode allows a given tube to be associated with the respective tube or tubes to which it may be joined by welding. This allows a quality record to contain the contract information, the material certification (i.e., from the Tube Mill), the time and date processed, and all quality checks performed on the part and the associated inspection records.

During boiler pressure part manufacturing the final location of each tube in the pressure part is not fully defined until the boiler is constructed at its final location. The pressure parts are assembled into multiple sub-assemblies that are small enough to be shipped to the plant site. Many identical sub-assemblies are often provided for each boiler. When these identical sub-assemblies leave the manufacturing plant their final location in the boiler has not yet been determined. During construction the identical sub-assemblies will be installed into the boiler. To fully track thousands of individual parts into their final locations in the completed boiler requires full tracking of each individual tube from the time it enters the manufacturing facility until it is installed in the completed boiler.

Combined with PLM and quality tracking systems the individual tubes can be associated with a specific location in a specific sub-assembly. Later, during plant construction, the final location of each sub-assembly can be identified in the finished boiler. In addition, identifying the sub-assemblies as they are installed is useful for tracking work progress (and man-hours or schedule required for installation) and quality assessments of field welds during construction.

During manufacture of the boiler, each tube is typically tracked by their serial numbers as they are transported between workstations to be fabricated into respective longer tubes and subsequently arranged into tube assemblies. Typically, the barcode printed on each tube is read by hand using hand-held barcode scanners, which may incorporate a camera, as the tubes are moved by conveyor from workstation to workstation.

However, many problems exist that make accurately and quickly reading barcodes displayed on the surface of a tube difficult in a manufacturing environment. For example, the orientation of the barcode on the tube is often not consistent relative to the barcode reader or camera while the tube is moved down a conveyor or other conventional handling system. Often, the barcodes may be difficult to locate quickly, or may be difficult to read quickly with the scanner, which may slow the assembly process. In some cases, the tube may need to be manually rotated around its longitudinal axis to orient the barcode to a visible, scannable location with respect to the scanner Additionally, conventional barcode readers are well known to read barcodes from a relatively flat surface, however, such conventional readers have difficulty reading barcodes from a curved surface such as the outer surface of a boiler tube. In such cases, the geometric distortion of the barcode on the tube surface can prevent proper identification.

Further, conventional barcode readers typically employ a single camera. However, due to the curved surface of a boiler tube, not all of a barcode may appear in a image from a single camera, depending on the orientation of the tube and camera. Moreover, even if more than one camera is considered, since the tubes are typically in continuous motion (such as due to motion of a conveyor as used in a typical boiler assembly area) different portions of the barcode may appear in different locations in an image formed from multiple cameras. Further, tubes with a reflective surface may generate bright reflections that obscure the barcode.

Further still, when dealing with a variety of tubes, having different outside diameters from each other, each different diameter will result in a different curvature of the barcode image thereon, and thus will change the expected location of the barcode in the resultant image. Moreover, the vertical displacement and focal point will change with changing diameter for tubes held in the same relative position.

Tubes which have a barcode stamped or dot-peened into the surface generate multiple reflections from each peened dot, which can create bright or dark spots in the barcode image that diminish legibility of the barcode.

What is needed therefor is a system and method to enable automated reading of a barcode on a tube surface, regardless of the orientation of the barcode on the tube while traveling down a conveyor, without requiring rotation of the tube to locate the barcode.

It would be further desirable for a device and system to enable tracking of individual tubes from the time they enter the manufacturing process until they are shipped to the plant site for installation.

BRIEF DESCRIPTION

In an embodiment, a system for reading a barcode displayed on an object is provided. The system includes a barcode reader having a plurality of cameras communicatively coupled to an image processor, and a controller device communicatively coupled to the plurality of cameras and the image processor. The plurality of cameras is arranged to define a first opening therebetween, having a first diameter sized to receive the object therein. The controller device triggers an operation of each camera. Each camera is operative to capture a respective image of a different corresponding portion of the outside surface of the object, and to send the respective image to the image processor. The image processor is configured to combine the respective images received from each camera into a composite image, and to read a barcode from the composite image.

DRAWINGS

The present invention will be better understood from reading the following description of non-limiting embodiments, with reference to the attached drawings, wherein below:

FIG. 3 is a schematic diagram of the embodiment of FIG. 1;

DETAILED DESCRIPTION

Figure 1:
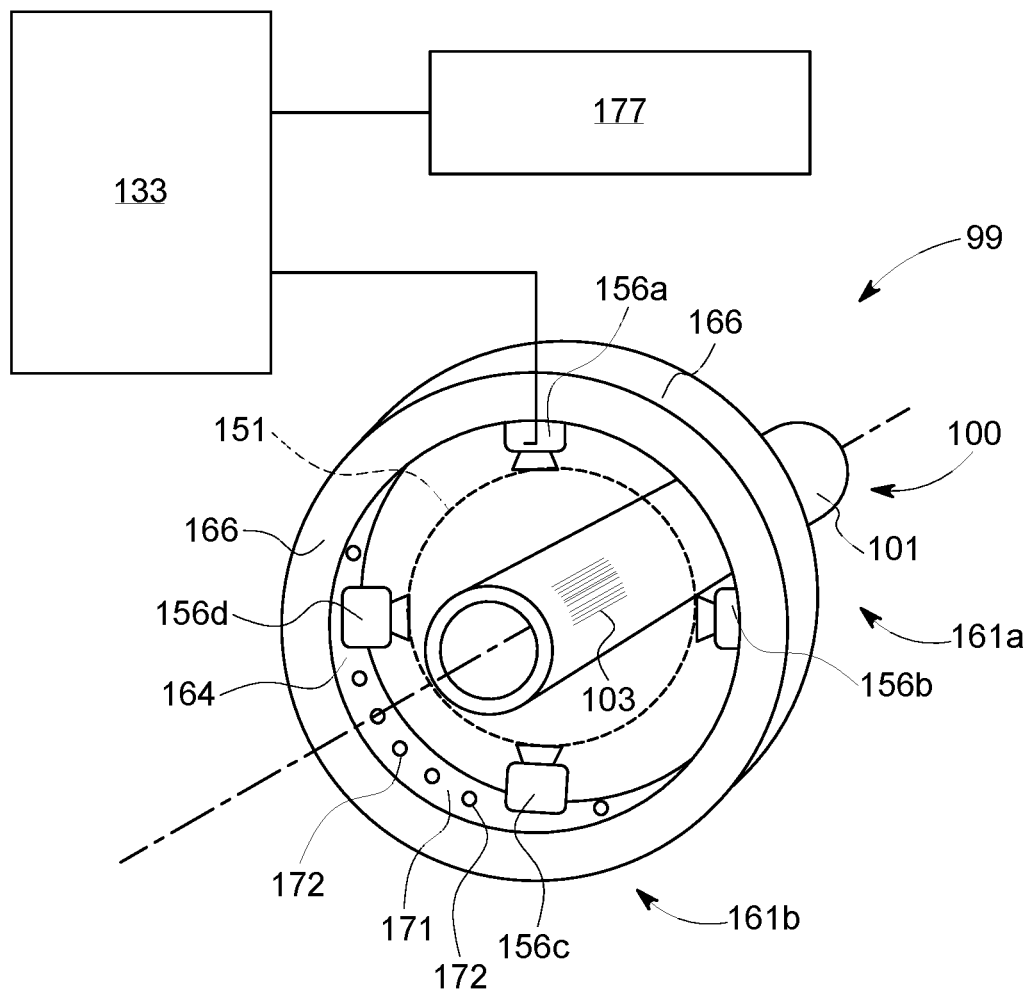
FIG. 1 is a partial perspective view of a system in accordance with an embodiment having four cameras.
Figure 2:
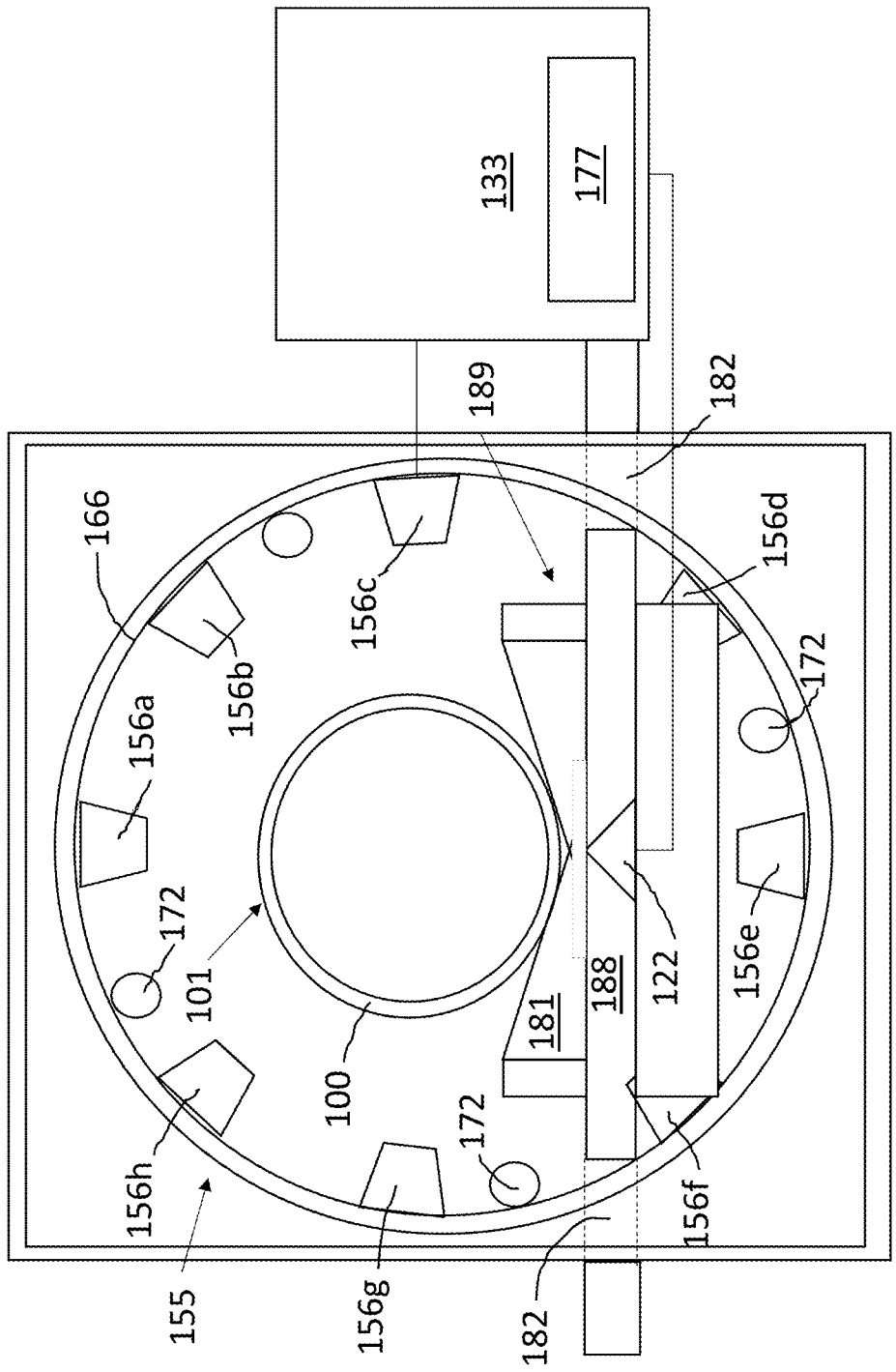
FIG. 2 is an illustration of an alternative embodiment having eight cameras.

Reference will be made below in detail to exemplary embodiments of the invention, examples of which are illustrated in the accompanying drawings. Wherever possible, the same reference characters used throughout the drawings refer to the same or like parts, without duplicative description.

While the embodiments disclosed herein are primarily described with respect to barcode readers for objects such as tubes, it is to be understood that embodiments of the present invention may be applicable to other apparatus and/or methods that benefits from the teachings herein. As used herein, the term "barcode" refers to any machine-readable optical label that contains information about the item to which it is attached. For example, as used herein, the term "barcode" may additionally refer to various types of optical labels, such as 1D barcode, code 128, code 39, DataBar, ITF, EAN, UPC Datamatrix, QR code, 2D barcode, PDF417, cadabar, code 93, Aztec code, or any other machine-readable optical label that contains information about the item to which it is attached.

Referring now to FIG. 1, an illustration of an embodiment of a system for reading a barcode 103 displayed on the outside surface 101 of an object 100 such as an elongate tube 100, is shown. As depicted herein, the tube 100 is shown as of circular cross-section, however the object or tube 100 may have any geometric cross section, including for example, rectangular, octagonal, triangular, T-shaped, and I-shaped. Moreover, it is contemplated that embodiments are not limited to operation with a tube 100, and any object 100 may be used in lieu of the tube 100 that allows embodiments to function as described herein. A plurality of cameras 155 is communicatively coupled to an image processor 177. A controller device 133 is communicatively coupled to the plurality of cameras 155 and the image processor 177. In some embodiments, the image processor 177 is integral with the controller device 133. In other embodiments, the plurality of cameras 155 may be communicatively coupled to the image processor through the controller device 133. The plurality of cameras 155 is arranged having a individual cameras 156 spaced apart to define a first opening 151 therebetween. The first opening is sized to receive the object 100 therein. For example, as depicted in FIG. 1, the first opening 151 may define a plane arranged orthogonal to the longitudinal axis of the tube 100 as the tube 100 is received within the first opening 151. As illustrated, the first opening 151 is circular. However, it will be appreciated that the particular shape of the first opening 151 is not so limited and may comprise, for example, a rectangular, a polygonal, or an irregular shape, sized to receive the tube 100 therein.

The plurality of cameras 155 may comprise any desired number of cameras 156 greater than one. In some embodiments, the plurality of cameras 155 may comprise four cameras 156a-d. In other embodiments the plurality of cameras 155 may comprise eight cameras 156a-h. In some embodiments, the number of individual cameras 156 in the plurality of cameras 155 may increase to accommodate an increase in the outside diameter of the desired tube 100. For example, in embodiments arranged for reading a 1D barcode, 4 cameras 156a-d may be used. In other embodiments, arranged for reading a 2D codes (for example QR codes), 8 cameras 156a-h may be used. In other embodiments, the number of cameras 156 in the plurality of cameras 155 may be selected based on the reflectivity of the object surface 101, and/or the level of detail desired to be resolved in the barcode image (after geometrical corrections have been applied during image processing) to obtain an adequate composite image 160.

In various embodiments, each camera 156 may be selectively triggered synchronously, sequentially, randomly, or any with any other desired timing. For example, with reference to FIG. 3, each camera 156a-d may each be triggered to operate in sequence by the controller device 133 to capture a respective image 159a-d of a corresponding portion of the entire perimeter of a segment of outside surface 101 of the tube 100. In other embodiments, the controller device 133 may synchronize a simultaneous trigger of each camera 15a-d to capture each respective image 159a-d. Each camera 156a-d of the plurality of cameras 155 is positioned to capture the respective image 159a-d of a different respective portion 102a-102d of the surface of the tube 100 while the tube 100 is positioned within, or proximal to, the first opening 151. Each camera 156a-d of the plurality of cameras 155 may cooperatively capture the respective image 159a-d. Each respective image 159a-d is then combined with the other respective images 159a-d by the image processor 177 to thereby obtain a complete or composite image 160. In this way, the composite image 160 provides an image of the entire periphery of a portion 102 of the outside surface 101 of the tube 100 without requiring the tube 100 to be rotated or any camera 156 to be moved. By arranging the individual cameras 156a-d of the plurality of cameras 155 to define an opening therebetween, and receiving the object within the opening, the cameras 156 can readily be triggered to capture respective images 159a-d of an entire outside perimeter of a longitudinal segment of the object having the barcode, regardless of the rotational orientation of the object.

In some embodiments, the composite image 160 may be made using a cylindrical projection to provide a flattened or straightened image 160 of the barcode. It is to be appreciated that FIG. 3 is provided merely for illustration, and the images 159a-d may be arranged and displayed differently than shown, and using more, or fewer, images than shown. Additionally, each of the images 159a-d may further comprise a series of images (not shown). In embodiments, the series of images (not shown) may themselves be combined to obtain a respective composite image 159a-d. Alternatively, in some embodiments, some of the images 159a-d may be omitted.

In embodiments, the individual cameras 156 may comprise miniature high resolution 5 megapixel or greater cameras. Each individual camera 156 may comprise a dedicated controller 133, or in other embodiments, the plurality of cameras 155 may be controlled by a centralized controller 133. The cameras 155 may be communicatively coupled to the controller 133 and image processor 177 using intermediate hardware, a custom processing appliance, or a frame grabber within a computer using a commercially available analog or standardized digital interface such as Camera Link, or CoaXPress. In embodiments, the cameras 156 may be digital cameras capable of direct connections (i.e., without a framegrabber) to the controller 133 or image processor 177 via FireWire, USB, or Ethernet interfaces.

The plurality of cameras 155 may be mounted or rigidly affixed on a frame 166. In an embodiment, the frame defines a second opening 161 sized to receive the tube 100 therein. In some embodiments, the frame 166 is arranged as a torus or annulus to define the second opening 161 sized to receive the tube 100 longitudinally therethrough. In embodiments, the second opening 161 is concentric with the first opening 151. However, the particular shape of the second opening 161 may be different from that of the first opening and may define, for example, a circle, a rectangle, a polygon, or an irregular shape, sized to receive the tube 100 therein.

The frame 166 may define a box or cubic shape. In some embodiments, the frame 166 may define a ring or hollow cylindrical shape. In various embodiments, the frame 166 is arranged to support any number of cameras 156. Additionally, the frame 166 may support one or more light sources 172, such as an LED or incandescent bulb. In embodiments, the plurality of cameras 155 are mounted radially around an inner periphery 164 or inside diameter defined by the frame 166. In other embodiments, the plurality of cameras 155 are mounted anywhere on the frame 166 that allows the system Additionally, the frame 166 is configured to support the necessary control and power wiring (not shown) necessary to operate each camera 156 and light source 172.

The size of the second opening 161 of the frame 166 may be further based on a predetermined dimensional range of outside diameters or perimeters of tube 100. For example, in conventional boiler tubing, the outside diameter of the tubes 100 are generally in the range of 1.5 to 3 inches (38 to 76 mm). The size of the opening or first opening 151 may also be based on a focal length or the distance of the camera 155 lens to the outside surface 101 the tube 100 necessary to obtain a desired image quality.

In embodiments, the frame 166 is assembled using modular connectable elements or sections to enable the frame 166 to be adjustable to a desired size and/or shape to accommodate varying tube sizes. For example, the frame 166 may be arranged as a modular assembly using a series of segments or links 168 to cooperatively build the frame 166. The links 168 are successively coupled or joined in series to define a torus or ring shape having the second opening 152 defined therethrough. Depending on the outside diameter of the tube 100 expected to be positioned longitudinally within the frame 166, the size of the second opening 152 may be selectively made larger by adding one or more links 168, or smaller by removing one or more links 168. In still other embodiments, one or more links 168 may be configured to have an adjustable length such that the size of the second opening 152 may be extending the length of the one or more links 168, or smaller by reducing the length of the one or more links 168.

Each respective link 168 may be coupled to a successive link 168 in any number of ways. For example, each link 168 may be joined to an adjacent link 168 to define a joint 163 therebetween by way of a pin, fastener, or clip 170 removably disposed through or coupled to each adjacent link 168. To further speed assembly, each link 168 may have one or more cameras 156, and one or more lights 172 pre-mounted to a respective link 168 prior to joining to the adjacent link 168.

Figure 4A:
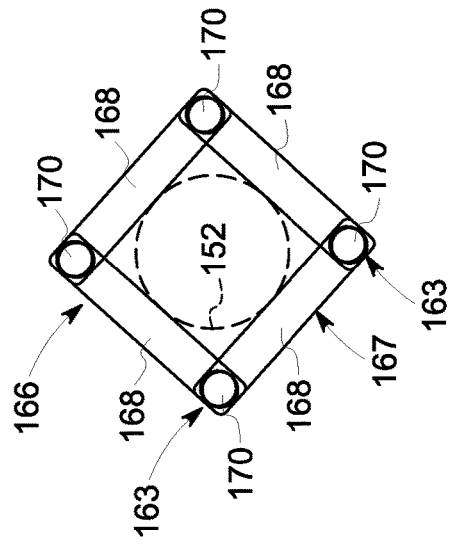
FIG. 4A is a perspective view of a frame according to an embodiment.
Figure 4B:
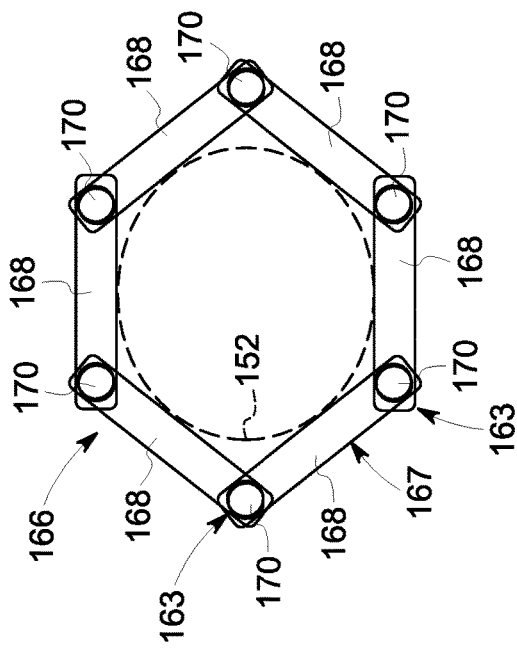
FIG. 4B is a perspective view of an alternative frame according to an embodiment.

For example, FIG. 4A depicts an embodiment of a frame 166 that comprises three segments or links 168 successively coupled using pins 170 in an end-to-end manner to define a second opening 152 therethrough to receive a tube 100 having a first outside diameter therethrough. By selectively adding a link 168 between two adjacent or successive links 168 in the three-legged frame 166 of FIG. 4A, a four-legged frame 166 may thereby be arranged as depicted in FIG. 4B. It will be appreciated that the four-legged frame 166 of FIG. 4B arranged by adding a link 168 to the frame depicted in FIG. 4A, will define an opening 152 therethrough that is larger than the opening 152 of the three-legged frame 166, and would advantageously be configured to receive a tube 100 having a second outside diameter that is larger than the first outside diameter.

Figure 4C:
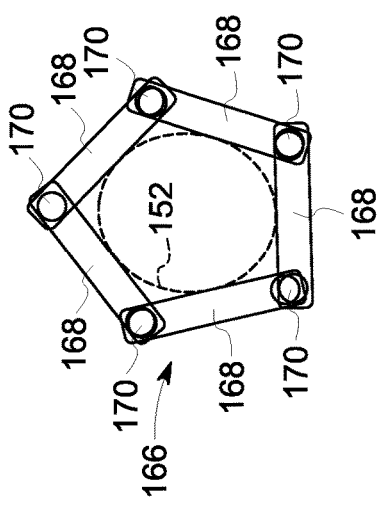
FIG. 4C is a perspective view of another alternative frame according to an embodiment.
Figure 4D:
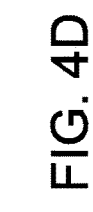
FIG. 4D is a perspective view of another alternative frame according to an embodiment.

In like manner, by selectively adding a segment or link 168 in series between two adjacent or successive links 168 in the four-legged frame 166 of FIG. 4B, a five-legged frame 166 may be arranged as depicted in FIG. 4C. It will be appreciated that the five-legged frame depicted in FIG. 4C when arranged by adding a link 168 to the frame 166 depicted in FIG. 4B, will define an opening 152 therethrough that is larger than the opening 152 of the four-legged frame 166 of FIG. 4B, and therefore would advantageously be configured to receive a tube 100 having a third outside diameter that is larger than the second outside diameter. Each of the frames 166 embodiments in FIGS. 4B, 4C, and 4D may selectively be reduced in size by removing one or more links 168 and successively connecting the remaining links 168 to define the second opening 152 therethrough. In various embodiments, each link 168 in frame 166 is coupled to one or more respective cameras 156. In other embodiments, not every link 168 in frame 166 is coupled to a camera 156.

Figure 5:
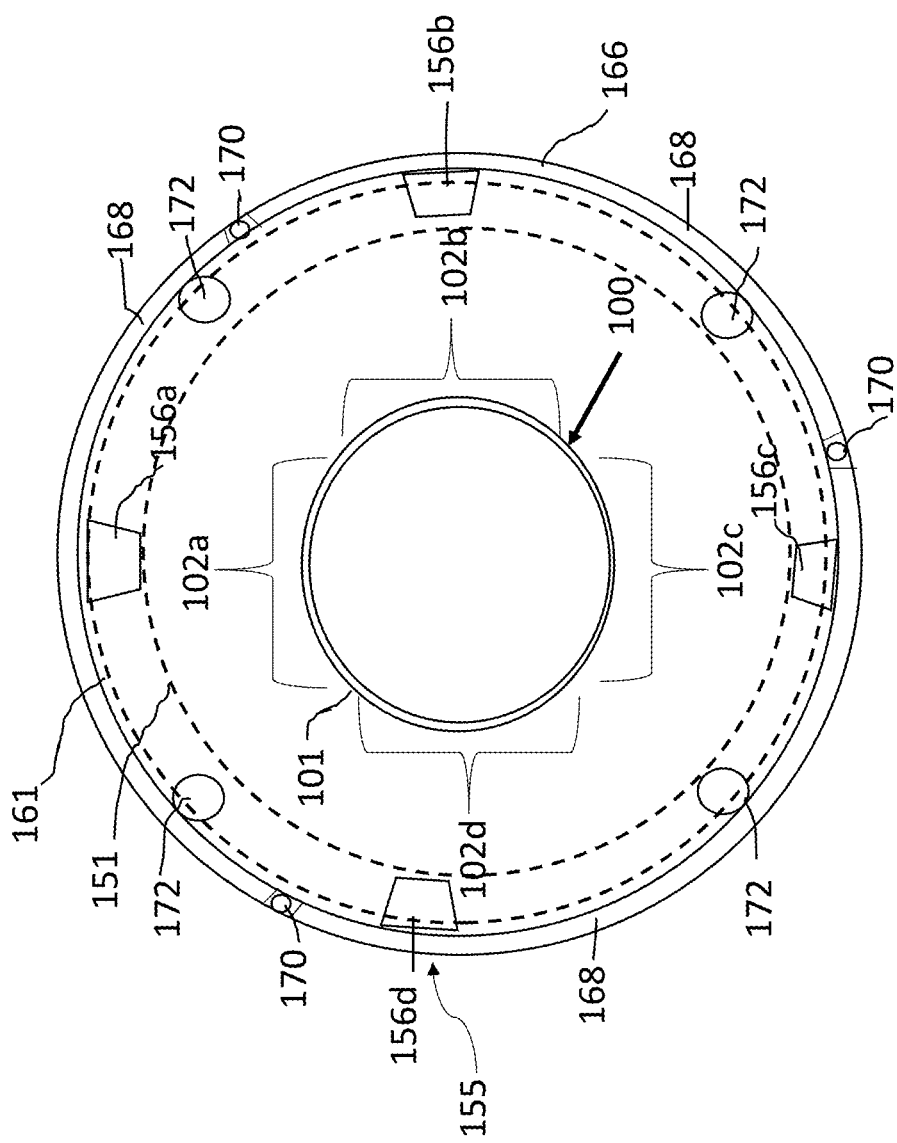
FIG. 5 is an illustration in partial cross-section of an embodiment.

It will also be appreciated that while each frame 166 depicted in FIGS. 4A-4D is shown having successive links 168 that are relatively straight or elongate, and having a length that is substantially equal, to thereby define the second opening 152 therethrough that is generally triangular, rectangular, pentagonal, and hexagonal, respectively, other embodiments are not so limited. For example, in other embodiments, the segments or links 168 may be arcuate to thereby define a second opening 152 that is circular. For example, as depicted in FIG. 5, an alternative embodiment is shown having two or more arcuate links 168 connected end-to-end in series to define a ring-shaped frame 166. In still other embodiments, each successive link 168 comprising the frame 166 may have a geometry and/or length that is different from an adjacent link 168.

As further depicted in the embodiment as shown in FIG. 5 the plurality of cameras 155 is coupled to the inner surface 164 of the frame 166. While some embodiments may include external lighting (i.e., a light source not attached to the frame 166), other embodiments may include a light source 172 coupled to the frame 166. For example, with reference to FIG. 1, a groove 171 is defined on the inside surface 164 of the inner side of frame 166. The groove 171 may extend between two or more cameras 156, or in other embodiments, between a camera 156 and a respective joint 163 between two coupled links 166. A light source 172 which may include one or more lamps or light-emitting diodes (LEDs) may be disposed in the groove 171 to provide additional or primary lighting, without reducing the effective size of the second opening 152.

In embodiments, at least a portion of the tube 100 is supported by a support surface 188 while the tube 100 is received longitudinally through the frame 166. For example, the support surface 188 may comprise a conveyor device 189. The support surface 188 may also comprise a series of rollers 181 such as V-type rollers 181 arranged to receive the tube 100 longitudinally thereon to self-center the tube 100 between the V-type rollers 181 on conveyor 189. The support surface 188 may further comprise openings 182 therethrough. In embodiments the openings 182 are sized and spaced to receive at least a portion of the frame 166 therein.

Some embodiments, such as those employing flat or non-V type rollers 181, further comprise a centering device (not shown) the device to keep the tube equidistant to the camera view. If an application requires a very large range of varying tube or pipe diameters, it will be necessary to elevate and center the tube 100. In this case, an optical or laser measuring system (not shown) may approximate the tube diameter and raise or lower the device to keep the tube 100 within a desired range of focus of the cameras 155.

In an embodiment, a proximity sensor 122 is provided in signal communication with the controller 133. The proximity sensor 122 may be any known type of sensor, such as capacitive, hall effect, inductive, magnetic, or photoelectric. When the tube 100 is fed longitudinally through a first entry side 166a of the frame 166, the proximity sensor 122 is configured to detect the presence of the tube 100 within or proximal to the frame 166. The proximity sensor 122 is further configured to output a first signal to the controller 133 based on the detection of the presence of the tube 100. In response to the first signal, the controller 133 may trigger the light source 172 to turn on or illuminate to provide illumination on the outside surface of tube 100. Additionally, in response to the first signal, the controller 133 may be configured to trigger an operation of each of the cameras 156 to capture a respective image 159 of the tube 100. The light source 172 may be arranged to provide uniform lighting around all, or in some embodiments, a portion, of the outside surface 101 of the tube 100. In some embodiments, a non-transparent box or housing 159 may be arranged to enclose the frame 166 to reduce stray ambient light to control the illumination on the tube 100. Polarized light and cross-polarization filters on the cameras 156 may additionally be used to minimize reflections on the tube 100 surface 101. When the tube 100 passes through the housing 159, exiting through a second exit side 166b of the frame 166, the proximity sensor 122 is also configured to detect the departure or absence of the tube 100. The proximity sensor is further configured to output a second signal to the controller 133 based on the detection of the exit or absence of the tube 100 from the frame 166. In response to the second signal, the controller 133 may trigger the light source 172 to turn off. Additionally, in response to the second signal, the controller 133 may be configured to cease operation of each of the cameras 156

Figure 6:
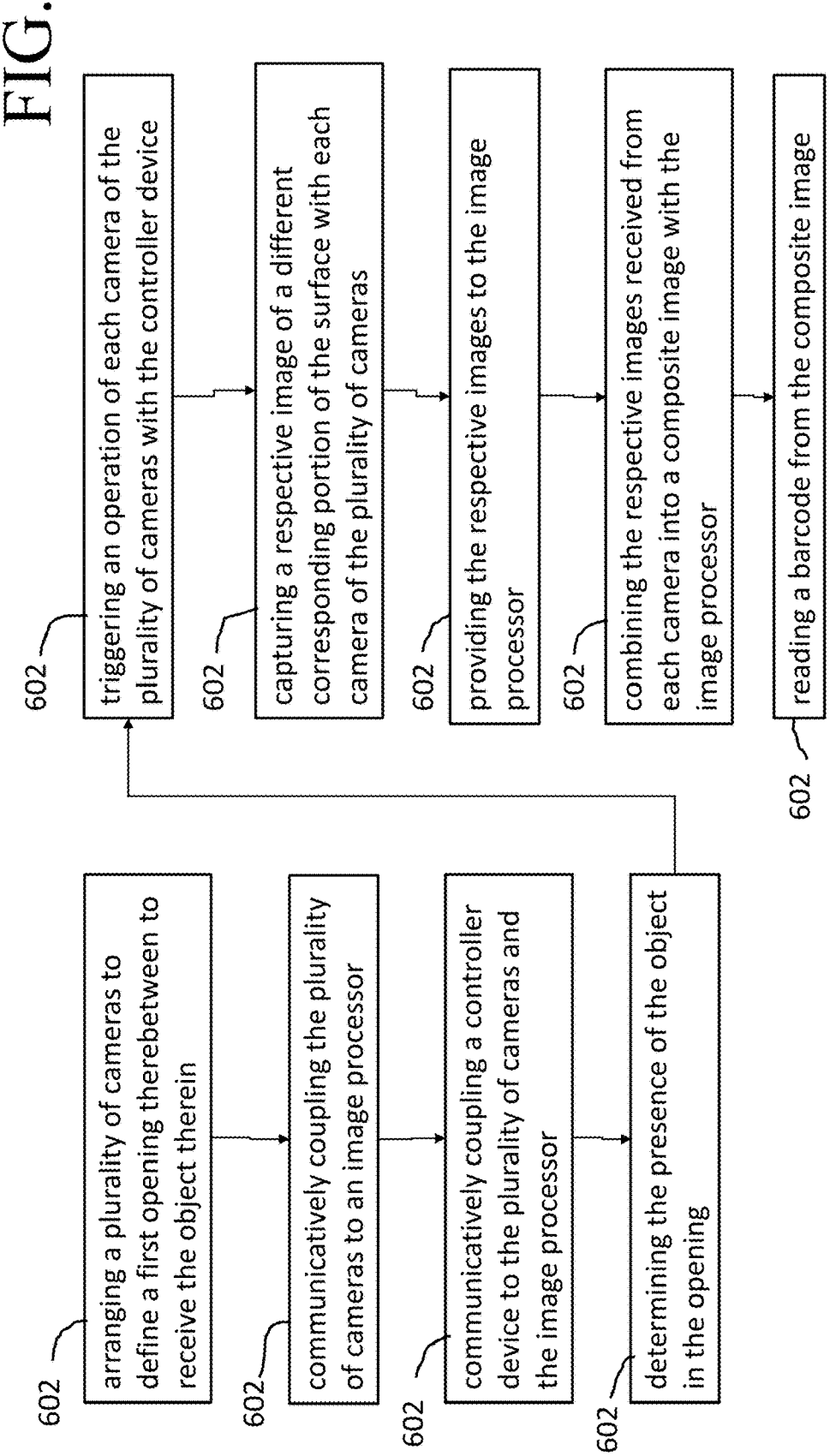
FIG. 6 is a flow diagram depicting a method according to an embodiment.

Embodiments as described herein may further comprise a method to read a barcode displayed on an object 100. With reference to FIG. 6, the method may comprise at step 601 arranging a plurality of cameras to define a first opening therebetween to receive the object therein, and at step 602 communicatively coupling the plurality of cameras to an image processor, and at 603 communicatively coupling a controller device to the plurality of cameras and the image processor.

Next at step 604, determining the presence of the object in the opening, and 605 triggering an operation of each camera of the plurality of cameras with the controller device, thereby 606 capturing a respective image of a different corresponding portion of the surface with each camera of the plurality of cameras.

At 607, providing the respective images to the image processor, and 608 combining the respective images received from each camera into a composite image with the image processor; and at step 609 reading a barcode from the composite image.

While the dimensions and types of materials described herein are intended to define the parameters of various embodiments, they are by no means limiting and are merely exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "above," "below," etc. are used merely as labels, and are not intended to impose numerical or positional requirements on their objects. Further, the limitations of the following claims are not written in means-plus-function format and are not intended to be interpreted as such, unless and until such claim limitations expressly use the phrase "means for" followed by a statement of function void of further structure.

This written description uses examples to disclose several embodiments of the invention, including the best mode, and to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for reading a barcode displayed on a surface of a tube, the system comprising:
    an annular frame;
    a plurality of cameras radially arranged on the annular frame to define a first opening sized to receive the tube therein, the plurality of cameras communicatively coupled to an image processor;
    a controller device communicatively coupled to the plurality of cameras and the image processor, wherein:
    the controller device is configured to trigger an operation of each camera of the plurality of cameras; each camera of the plurality of cameras is operative to capture a respective image of a different corresponding portion of the surface, and send the respective image to the processor; and
    wherein the image processor is configured to combine the respective images received from each camera into a composite image, and to read a barcode from the composite image; and,
    wherein the composite image provides an image of an entire periphery of a portion of an outside surface of the tube.

2. The system of claim 1, further comprising a frame defining a second opening sized to receive the object therein, wherein the cameras are mounted on the frame.

3. The system of claim 2, further comprising a non-transparent housing arranged to surround the frame.

4. The system of claim 2 wherein the frame defines a torus comprising a plurality of links successively coupled in series.

5. The system of claim 4, wherein the size of the second opening is selectively modified by adding and/or removing one or more links.

6. The system of claim 2, further comprising a plurality of light sources coupled to the frame and operative to illuminate the surface of the object.

7. The system of claim 6, wherein the controller device is configured to trigger the plurality of light sources to illuminate the surface of the object synchronously with the operation of each camera.

8. The system of claim 1, wherein the controller device synchronously triggers each camera of the plurality of cameras to capture the respective images.

9. The system of claim 1, wherein the controller device sequentially triggers each camera of the plurality of cameras to capture the respective images.

10. The system of claim 1, wherein each camera of the plurality of cameras is configured to capture a respective image of a different corresponding portion of a perimeter of a longitudinal segment of the object surface.

11. The system of claim 1, further comprising a sensor in signal communication with the controller device, the sensor configured to detect the presence of the object within the first opening, and to provide a first signal to the controller device in response to the presence.

12. The system of claim 1, further comprising a support surface configured to support the object, and wherein the support surface is a conveyor configured to move the object through the first opening.

13. The system of claim 12, wherein the support surface further comprises a centering device configured to position the object such that the distance between each respective camera of the plurality of cameras and the corresponding portion of the surface of the object is substantially equal.

14. The system of claim 11, wherein the sensor is further configured to detect a departure of the object from the first opening, and to provide a second signal to the controller in response to the departure.

15. A method for reading a barcode displayed on a surface of a tube, the method comprising:
   providing an annular frame;
   arranging a plurality of cameras on the annular frame to define a first opening to receive the tube therein;
   communicatively coupling the plurality of cameras to an image processor;
   communicatively coupling a controller device to the plurality of cameras and the image processor;
   determining the presence of the object in the opening;
   triggering an operation of each camera of the plurality of cameras with the controller device;
   capturing a respective image of a different corresponding portion of the surface with each camera of the plurality of cameras;
   providing the respective images to the image processor; and,
   combining the respective images received from each camera into a composite image illustrating an entire periphery of a portion of an outside surface of the tube with the image processor; and
   reading a barcode from the composite image.

16. The method of claim 15, further comprising mounting the cameras on a frame having a second opening sized to receive the object therein.

17. The method of claim 16, further comprising mounting a plurality of light sources on the frame.

18. The method of claim 17, further comprising triggering the plurality of light sources to illuminate the surface of the object synchronously with the operation of each camera.

19. The method of claim 18, further comprising forming the frame by coupling a series of links in series to define a torus.

20. The method of claim 15, further including positioning the object within the first opening such that the distance between each respective camera of the plurality of cameras and the corresponding portion of the surface of the object is substantially equal.

* * * * *